UNITED STATES PATENT OFFICE 2,534,677

PRODUCTION OF URANIUM HALIDES

Amos S. Newton and Oliver Johnson, Ames, Iowa, assignors to the United States of America as represented by the United States Atomic Energy Commission No Drawing. Application February 17, 1945, Serial No. 578,538

10 Claims. (Cl. 23—14.5)

This invention relates to the production of uranium halides. It is known to produce uranium halides from uranium oxides by reaction with halogen or hydrohalogen usually in the presence of a reducing agent. This process is frequently difficult to conduct and often the products are contaminated with oxyhalides, oxides and other impurities.

Formation of uranium halides particularly the tetra-halides from metallic uranium, frequently is found to be complicated due to the fact that the halide formed tends to coat the metal and stop the reaction. Where the uranium is in massive form of substantial size this difficulty is particularly acute, since only a small surface layer of the halide is formed and the major portion of uranium metal remains unaffected. On the other hand powdered uranium metal is readily oxidized and therefore the oxide either tends to prevent the reaction or to contaminate the reaction product.

In accordance with the present invention, it has been found that uranium halides may be prepared by reaction of halogen and/or hydrohalides with uranium hydride above, at, or below the decomposition temperature of the hydride. This process is particularly effective in the preparation of halides from uranium metal. Uranium metal, commonly available at the present time, generally is in the form of massive billets or ingots which are substantially free from oxide in the interior thereof. By reacting such ingots or shavings therefrom which have substantial weight (usually at least ten or more grams) with hydrogen and subsequently converting the resulting hydride to the halide many of the objections to the formation of uranium halide (surface coating with halide, etc.) are eliminated.

The preparation of a uranium halide by the reaction of a uranium hydride product and a halogen-containing material may be carried out rapidly, with an unusual simplicity of operation and apparatus. This results largely from the fact that the uranium hydride product has been found to be very reactive with halogens or halogen-containing materials under the conditions of the process, particularly where the uranium hydride is prepared in the closed system in which the halogenation reaction is carried out. Also, the uranium halide as provided by the invention is in a powdered, anhydrous state which permits various gaseous impurities to be easily removed therefrom. Thus the process permits production of a halide in highly pure and generally pulverulent state.

Broadly, the invention in its simplest form provides a process in which a uranium hydride product is reacted with a halogen or a halogen-containing material to form a uranium halide.

The invention further includes the successive steps of reacting uranium, preferably in the form of metal which is free from internal oxide, with hydrogen to form uranium hydride, and then reacting such uranium hydride or a decomposition product thereof with the halogen or halogen-containing material to form the desired uranium halide. Preferably, all of the reactions are carried out in a closed system in which the hydrogen as well as the halogen or the halogen-containing material are successively introduced into the system for reaction with the uranium and air is excluded. The preparation of the uranium halide is carried out under suitable reaction conditions with respect to temperature, pressure, and the like to prevent or minimize caking agglomeration or fission of the reaction mass.

Thus it is an object of the invention to provide an improved process for the preparation of a uranium halide.

A further object of the invention is the preparation of a uranium halide by the reaction of a halogen or a halogen-containing material with a uranium hydride or a decomposition product thereof.

A more specific object of the invention is the provision of a process in which uranium hydride is prepared in a closed system by the reaction of uranium, either in elemental or in compound form, and hydrogen, and in which a uranium halide is formed by the reaction of such uranium hydride or a decomposition product thereof and a halogen or a halogen-containing material in the closed system.

Further objects and advantages will be apparent from the following description.

The reaction of the hydride with halogen or hydro-halogen or other halogenating agent generally is conducted at an elevated temperature which may be above or below the decomposition temperature of uranium hydride but preferably is maintained below the temperature at which substantial caking or fusion of the reactant mass takes place. The exact mechanism of the reaction is not known. Thus during the halogenation it is possible that such uranium hydride either may be partially or completely decomposed before reaction with a halogenating agent or may react directly therewith. A particular advantage of this process lies in the fact that this direct halogenation apparently will occur and therefore the reaction may be conducted at a comparatively low temperature below the decomposition temperature of uranium hydride at atmospheric pressure. Throughout this description and the claims appended thereto, the term "reaction with uranium hydride" is intended to cover broadly the reaction which occurs when uranium hydride and a halogen or halogenating agent are contacted at reaction temperature, regardless of the nature of the reaction.

In preparation of the uranium hydride product prior to the halogenation reaction, it is desirable to have a relatively pure source of hydrogen for converting the uranium to uranium hydride. Impurities present in the hydrogen tend to contaminate the uranium hydride resulting from the reaction. Hydrogen as ordinarily obtained from commercial sources may be used for this purpose. If an unusually pure uranium hydride is desired, the hydrogen may be obtained from the decomposition of previously prepared uranium hydride.

The halogenating agent is preferably one that may be used in vapor form. The elemental halogens may be used in gaseous state and the hydrogen halides, such as hydrogen fluoride, hydrogen chloride, hydrogen bromide, and hydrogen iodide in their gaseous state are particularly suitable for use in the process of this invention. Other halogen-containing materials such as carbon tetrafluoride, carbon tetrachloride ($CCl_4$), carbonyl chloride ($COCl_2$), and methyl iodide ($CH_3I$) have been used successfully in vapor form for converting uranium hydride to the corresponding uranium halide. Other halogen-containing materials in which the halogen constituent is in a reactable form may be utilized in the process. It is preferred that the halogen or halogen-containing material be obtained in a pure state so as to prevent or minimize the introduction of such impurities into the uranium halide product.

The uranium metal from which the hydride and halide ultimately is to be produced generally is in massive form as lumps or bodies of substantial size or turnings from said bodies having a minimum size of about 10 mesh which are essentially free from oxide in the interior thereof. Massive substantially impervious uranium collected in molten state as a pool in a non-oxidizing atmosphere allowed to solidify in the form of ingots or billets, or turnings from said billets or ingots is suitable. This uranium may be reacted with hydrogen as such, or shavings or turnings thereof may be so treated. Powdered metal may also be treated although the present invention is especially concerned with the treatment of massive metal, since it affords a simple method of securing a complete or substantially complete halogenation without the caking or surface coating commonly encountered. The reactions of hydrogenation and halogenation may be conducted in the same or different apparatus as desired.

One of the important conditions of the reaction is that of temperature. The valence state of the uranium in dry form can be controlled somewhat by the temperature at which the reaction of the uranium metal and the halogenous material is carried out. A particular advantage of this process lies in the fact that the halogenation may be conducted at a temperature below the melting point of the halide being formed thereby eliminating caking or agglomeration of the reaction mixture by molten halide. By maintaining the temperature of the reaction below that of the melting point of the uranium halide, the reaction product is obtained as a fine, dry powder, which is easily handled and which is of high purity. The specific temperature conditions of the reaction are dependent upon the particular halogen or halogen-containing material that is being reacted with the uranium as hereinafter described.

The reaction may be conducted in any convenient apparatus which affords adequate contact between the gaseous halogenating agent and the solid hydride. For example, a shaft furnace or a rotary reactor may be used. If desired gaseous halogenating agent may be passed over or through a porous bed of the hydride or other convenient method of conducting a gas-solid or liquid-solid reaction may be restorted to.

Usually the process is carried out by preparing the uranium in the form of a uranium hydride product in the reaction chamber, and then reacting such uranium product with halogenating agent in vapor state to obtain the desired uranium halide.

In the first step of the process of this embodiment, the massive or bulky uranium may be converted to uranium hydride by passing gaseous hydrogen over uranium metal in the form of lumps, turnings, etc., at a temperature of between 200° C. and 400° C. Prior to hydrogen treatment the uranium metal generally is cleaned with an acid, such as 6N $HNO_3$, to remove surface impurities such as uranium oxides, uranium carbides, or the like. Where the uranium metal is not cleaned, the impurities remain in the reaction chamber and tend to contaminate the final uranium halide. The cleaned uranium, in the form of more or less impermeable lumps, turnings, or the like, is placed in a closed reaction chamber and hydrogen is introduced into the chamber to completely flush out the system.

After the air is removed from the reaction chamber, the chamber is heated to raise the temperature of the uranium metal to a temperature between 200° C. and 400° C. Preferably, the temperature of the uranium is brought to approximately 250° C. Hydrogen is introduced into the reaction chamber at or below atmospheric pressure, the hydrogen reacting with the uranium metal to form uranium hydride. While there is a tendency for the hydrogen to lower the temperature of the uranium, the reaction is exothermic with approximately 30,000 calories per mole of uranium hydride being released to aid in maintaining the temperature of the uranium. Preferably, between 20 per cent and 40 per cent excess of hydrogen over that reacted with the uranium is used, the excess hydrogen passing out of the reaction chamber through a suitable outlet.

As the reaction proceeds, the uranium hydride is formed as a powder on the uranium metal. If uranium is in the form of a metallic mass of substantial size, and is supported so that a substantial portion of the under sides and/or vertical edges thereof is exposed to the hydrogen, the uranium hydride tends to slough off as it is formed thereby exposing additional metal for the reaction. This continues until substantially all of the uranium is converted to uranium hydride. The uranium hydride is a brownish-black or brownish-gray pyrophoric powder, with the purer portions having a dark gray appearance.

After the uranium has been converted to uranium hydride, the halogenating agent preferably in vapor state is passed into contact with this powder to form the uranium halide. The temperature of the halogenation reaction varies with the particular halogen being reacted with the uranium and the particular halide to be produced. Generally, the temperatures at which the reaction of the halogenous material and the uranium hydride or its product is carried out is between 200° C. and 500° C. and preferably the temperature is maintained below the melting point of the halide produced or at least below the fusion temperature of the reaction mass to avoid caking or agglomeration which would otherwise tend to occur.

The halogenating agent may be introduced into the reactor zone continuously during the reaction or the required amount of halogen may be added and the system closed until reaction has proceeded to a desired degree. Suitable means for heating or cooling the reactor may be provided, if necessary, diluent gases such as argon, or helium, may be introduced.

The following specific examples of the process embodying the invention include certain of the halogenous materials that may be used in carrying out the process.

*Example I*

I. A quantity of massive impermeable uranium metal in the form of turnings was placed in a reaction chamber. The temperature of the uranium metal was raised to approximately 250° C. Gaseous hydrogen was then admitted to the reaction chamber in a continuous stream and after approximately two hours, the uranium metal was disintegrated and conversion to finely divided uranium hydride was substantially complete. The temperature of the uranium hydride was then lowered to approximately 200° C. and gaseous chlorine diluted with 5 times its volume of nitrogen was admitted to the reaction chamber. The reaction between the gaseous chlorine and the uranium hydride product began immediately. The reaction was substantially complete after a few minutes, with substantially all of the uranium hydride product having been converted to uranium tetrachloride, $UCl_4$. $UBr_4$ and $UI_4$ may be prepared in the same manner using bromine or iodine vapor mixed with argon.

*Example II*

The process of Example I was repeated admitting gaseous hydrogen chloride to the reaction chamber with the temperature of the uranium material being maintained between 250° C. and 300° C. The anhydrous hydrogen chloride immediately reacted with the uranium hydride product to yield an olive green powder, uranium trichloride $UCl_3$. After cooling and disassembling the apparatus, the reaction product was removed in the form of a fine, dry powder.

*Example III*

Phosgene gas was passed over a quantity of uranium hydride powder dispersed in a bed in a horizontal tubular reaction chamber. The reaction proceeded rapidly at 150° C. to form $UCl_4$ contaminated with some carbon.

*Example IV*

A 200 gram piece of massive uranium metal was placed in a copper reaction chamber 10 inches long and 5 inches in diameter, fitted with outlets at the two ends and one end of which was a flange with a plate over the end bolted to the flange for removal of the product. The joint between the flange and the plate was sealed with $CaF_2$ paste (powdered $CaF_2$ wet with water to form a paste). This kept the seal reasonably tight. The metal piece was placed in a perforated rack (made of copper) in the upper part of the reaction chamber. In the setup described here HF and $H_2$ tanks were connected by means of a T-tube to the reaction chamber, the lines to both tanks being made of copper tubing; that to the $H_2$ tank was connected to the tank through a reducing valve. In the exit side of the chamber was a shut-off valve, then a dry ice-trichloroethylene (acetone or ether can be substituted for trichloroethylene) trap and finally a wet gas flow meter. The latter allows a convenient method of following the course of the reaction.

The apparatus was just flushed with $H_2$, the reaction vessel heated to 250° C. by means of a resistance furnace, and the stopcock at the exit end of the reaction chamber closed. The formation of pulverulent $UH_3$ required about 4 hours at 250° C. with an $H_2$ pressure of 5 pounds per square inch. The time of completion of hydride formation was determined by shutting off the main tank valve periodically and determining whether further uptake of $H_2$ occured. After the hydride was formed HF was introduced with the exit valve opened and the furnace still at 250° C. Two to three hours were required for the formation of $UF_4$. The course of this reaction was followed by measuring the volume of $H_2$ evolved. The reaction was apparently over in 2 hours, but it was allowed to run 3 hours to assure complete reaction.

The product consisted of 264 grams of material analyzing $UF_4$. It was in a dry powdered condition and was chemically pure.

*Example V*

Two hundred and fifty (250) grams of uranium turnings (cleaned in $HNO_3$, washed with $H_2O$ and acetone, and dried) were placed in a glass reaction tube 2½ inches in diameter and 18 inches long. At one end of the tube was a $^{29}/_{42}$ standard taper joint, the cap of which was connected to a stopcock and an outlet tube. The other end was drawn down to a tube one inch in diameter. This had a $^{24}/_{40}$ standard taper joint at the end and an inlet tube for gases on the cap to the joint. Between the joint and the main tube was placed 5 grams of uranium turnings held in place by glass wool plugs on each side of the turnings. This uranium served as a "getter" to purify the $H_2$ and HBr before it reached the main body of uranium.

The whole setup was mounted vertically in a suitable resistance furnace, preferably one that opens up so that the reaction chamber was easily taken out and replaced. The apparatus was flushed with $H_2$, the reaction tube heated to 250° C. and the uranium turnings were converted to pulverulent $UH_3$ in the closed system. This required about 2 hours but might have been longer depending on the condition of the surface of the turnings. After complete conversion to $UH_3$ as evidenced by no further absorption of hydrogen, using a manometer connected to the system to determine this factor, HBr was then passed through the apparatus for 12 hours. The $UH_3$ was agitated frequently by taking the reaction tube out and shaking it to prevent the material caking. There was about a two-fold expansion in going from $UH_3$ to $UBr_3$. The end of the reaction was determined by weighing the whole apparatus and passing in HBr till it came to constant weight; at the end of the reaction the apparatus was evacuated and the UBr₃ removed in a dry box to an air-tight container. The yield of UBr₃ from 250 grams of metal was 501 grams.

*Example VI*

Hydrogen was bubbled through methyl iodide at room temperature to saturate the hydrogen with methyl iodide vapor and the gaseous mixture was passed into a reactor containing uranium hydride heated to 300° C. UI₃ was produced.

Where the invention is to be carried out by reacting previously prepared uranium hydride and a halogenating agent to form the desired uranium halide, such uranium hydride is placed in the reaction chamber and the halogenation reaction is carried out as previously described. In this embodiment of the invention, it will generally be necessary to maintain the reactants at the desired temperature for a longer period of time than is necessary where the uranium hydride is prepared in situ.

The above detailed description is given for purposes of illustration, and the invention is to be limited only by the scope of the appended claims.

We claim:

1. A process of preparing a uranium halide which comprises reacting uranium hydride with a halogenating agent selected from the group consisting of elemental halogens, hydrogen halides, carbonyl halides and halogen substituted methanes.

2. A method of preparing a uranium fluoride which comprises reacting uranium hydride with hydrogen fluoride.

3. A method of preparing a uranium chloride which comprises reacting uranium hydride with hydrogen chloride.

4. A method of preparing a uranium bromide which comprises reacting uranium hydride with hydrogen bromide.

5. A method of preparing a uranium halide which comprises heating uranium hydride in contact with a halogenating agent selected from the group consisting of elemental halogens, hydrogen halides, carbonyl halides, and halogen substituted methanes at a temperature not above the melting point of the uranium halide to be formed.

6. A method of preparing a uranium halide which comprises reacting at an elevated temperature a massive uranium body with hydrogen to form pulverulent uranium hydride and then while maintaining said hydride at an elevated temperature reacting a halogenating agent selected from the group consisting of elemental halogens, hydrogen halides, carbonyl halides and halogen substituted methanes with said uranium hydride to form the uranium halide.

7. A method of preparing uranium fluoride which comprises forming pulverulent uranium hydride by the reaction at an elevated temperature of massive uranium with hydrogen, and while maintaining said hydride at an elevated temperature reacting hydrogen fluoride with said uranium hydride and recovering the resultant uranium fluoride.

8. A method of preparing uranium chloride which comprises forming pulverulent uranium hydride by the reaction at an elevated temperature of massive uranium with hydrogen and while maintaining said hydride at an elevated temperature introducing hydrogen chloride into contact with said uranium hydride, and reacting said substance and said uranium hydride product to form a uranium chloride.

9. A method of preparing a uranium halide which comprises reacting gaseous hydrogen with massive metallic uranium to form pulverulent uranium hydride, and while maintaining said hydride at an elevated temperature reacting gaseous hydrohalogen with said uranium hydride to form a uranium halide.

10. A method of preparing uranium halide which comprises reacting hydrogen with uranium while maintaining the temperature of said uranium between 200° C. and 300° C., to convert at least a portion of said uranium to uranium hydride, and while maintaining said hydride at a temperature of at least 200° C., reacting a halogenating agent selected from the group consisting of elemental halogens, hydrogen halides, carbonyl halides and halogen substituted methanes with said hydride at a temperature from 200° C. to 500° C.

AMOS S. NEWTON.
OLIVER JOHNSON.

REFERENCES CITED

The following references are of record in the file of this patent:

UNITED STATES PATENTS

| Number | Name | Date |
|---|---|---|
| 1,816,830 | Driggs | Aug. 4, 1931 |
| 1,835,024 | Driggs | Dec. 8, 1931 |

OTHER REFERENCES

"Introductory Information on Lithium Hydride," Lithaloys Corporation, 444 Madison Avenue, New York 22, New York. (Copy in Division 59.) (Released January, 1946.)